US012596231B2

(12) United States Patent
Geoffrion et al.

(10) Patent No.: US 12,596,231 B2
(45) Date of Patent: Apr. 7, 2026

(54) SINGLE MODE WIDEBAND POLARIZATION MAINTAINING FIBER COUPLER

(71) Applicant: Thorlabs, Inc., Newton, NJ (US)

(72) Inventors: Eric Geoffrion, Montreal (CA); Sorin Iacob, Laval (CA); Damien Stryckman, Montreal (CA); Lucas Majeau, Mascouche (CA)

(73) Assignee: Thorlabs, Inc., Newton, NJ (US)

( * ) Notice: Subject to any disclaimer, the term of this patent is extended or adjusted under 35 U.S.C. 154(b) by 287 days.

(21) Appl. No.: 18/409,170

(22) Filed: Jan. 10, 2024

(65) Prior Publication Data

US 2024/0241318 A1 Jul. 18, 2024

Related U.S. Application Data

(60) Provisional application No. 63/438,887, filed on Jan. 13, 2023.

(51) Int. Cl.
*G02B 6/255* (2006.01)
*G02B 6/024* (2006.01)
(52) U.S. Cl.
CPC .............. *G02B 6/255* (2013.01); *G02B 6/024* (2013.01)
(58) Field of Classification Search
CPC ........................................................ G02B 6/255
See application file for complete search history.

(56) References Cited

U.S. PATENT DOCUMENTS

| 2003/0165283 A1* | 9/2003 | Huang | G02B 6/2551 |
| | | | 385/11 |
| 2005/0031280 A1* | 2/2005 | Izoe | G02B 6/105 |
| | | | 385/123 |
| 2005/0135762 A1* | 6/2005 | Ikeda | H01S 3/06708 |
| | | | 385/127 |
| 2020/0012041 A1* | 1/2020 | Ichii | C03B 37/02709 |
| 2022/0077643 A1* | 3/2022 | Petit | H01S 3/06729 |

FOREIGN PATENT DOCUMENTS

| CN | 1825149 A | 8/2006 |
| JP | 2002023001 A | 1/2002 |

OTHER PUBLICATIONS

European Search Report with written opinion issued by the European Patent Office for European Patent Application No. 24150518.9-1001, mailed on Jun. 14, 2024.

* cited by examiner

*Primary Examiner* — Lisa M Caputo
(74) *Attorney, Agent, or Firm* — Myers Wolin, LLC

(57) ABSTRACT
A single mode wideband polarization maintaining (PM) fiber coupler, including: a first PM fiber having a first core and a pair of first stress members configured to provide a first mechanical stress to the first core; and a second PM fiber having a second core and a pair of second stress members configured to provide a second mechanical stress to the second core; wherein a length of the first PM fiber is fused with a corresponding length of the second PM fiber, wherein at least one geometry among the first core and the pair of first stress members is different from a corresponding at least one geometry among the second core and the pair of second stress members, and the difference in the at least one geometry between the first and second PM fibers causes a frustrated coupling between the first and second PM fibers.

12 Claims, 5 Drawing Sheets

Slow Axis

Fast Axis

240

230

220

210

Port 2 (Signal Output)

Port 1 (Input)

Port 3 (Tap Output)

SINGLE MODE WIDEBAND POLARIZATION MAINTAINING FIBER COUPLER

CROSS REFERENCE TO RELATED APPLICATIONS

This application claims the benefit of U.S. Provisional Patent Application No. 63/438,887 filed on Jan. 13, 2023. The disclosure of U.S. Provisional Patent Application No. 63/438,887 is hereby incorporated by reference.

TECHNICAL FIELD

The present disclosure generally relates to fiber coupler or tap, and more particularly to a single mode wideband polarization maintaining fiber coupler or tap.

BACKGROUND

All fused fiber optical couplers have wavelength dependent coupling uniformity. Certain applications such as scanning laser systems require this uniformity to be as flat (wideband) as possible over as large as possible bandwidth. Certain applications also require that the polarization state of the light source remains constant when passing through the coupler.

The manufacturing process to produce a wideband component using single mode (non-polarization maintaining) fiber is well known. Prior to fusing the two fibers together to manufacture the coupler, the propagation constant is made asymmetrical by tapering, chemically etching or doping one of the two fibers. This results in an asymmetrical structure that provides for frustrated coupling from the signal to the tap fiber and results in a coupling response that has a flatten coupling response.

This type of process is hard to apply to polarization maintaining (PM) fibers as the internal structure of the fiber limits the amount of tapering or etching that can be done. For example, in a Panda PM fiber ("Panda" refers to the resemblance of the fiber's cross-section to the face of a panda), there are stress rods that run parallel to the fiber's core and apply stress that creates birefringence in the fiber's core, allowing polarization-maintaining operation. However, the presence of the stress rods internal structure, in the case of Panda type PM fibers, limits the application of the above manufacturing process.

Attempts had been made to achieve the required asymmetry in the propagation constant with a PM fiber by chemically etching it, but this process did not provide a large enough change to achieve strong coupling frustration.

Currently the technical community in this field has not been able to achieve the optical response this structure provides using fused fiber technologies. The only similar results are found in planar wave guide components, but these are only offered over a very limited wavelength range (1300-1600 nm).

Therefore, there is a long-felt need for a novel structure that allows for the polarization state of the light as well as the coupling ratio to be maintained over a larger optical bandwidth than components currently offered. This structure can be applied to all wavelength ranges from the visible to the near-IR.

SUMMARY

An embodiment of the present disclosure provides a single mode wideband polarization maintaining (PM) fiber coupler, including: a first PM fiber having a first core and a pair of first stress members configured to provide a first mechanical stress to the first core; and a second PM fiber having a second core and a pair of second stress members configured to provide a second mechanical stress to the second core; wherein a length of the first PM fiber is fused with a corresponding length of the second PM fiber; wherein at least one geometry among the first core and the pair of first stress members is different from a corresponding at least one geometry among the second core and the pair of second stress members, and the difference between the at least one geometry of the first PM fiber and the corresponding at least one geometry of the second PM fiber causes a frustrated coupling between the first PM fiber and the second PM fiber.

An embodiment of the present disclosure provides a method of making a single mode wideband polarization maintaining (PM) fiber coupler, including: providing a first PM fiber having a first core and a pair of first stress members configured to provide a first mechanical stress to the first core; providing a second PM fiber having a second core and a pair of second stress members configured to provide a second mechanical stress to the second core; and fusing a length of the first PM fiber with a corresponding length of the second PM fiber; wherein the first and second PM fiber are selected such that at least one geometry among the first core and the pair of first stress members is different from a corresponding at least one geometry among the second core and the pair of second stress members, and the difference between the at least one geometry of the first PM fiber and the corresponding at least one geometry of the second PM fiber causes a frustrated coupling between the first PM fiber and the second PM fiber.

DETAILED DESCRIPTION

Figure 1:
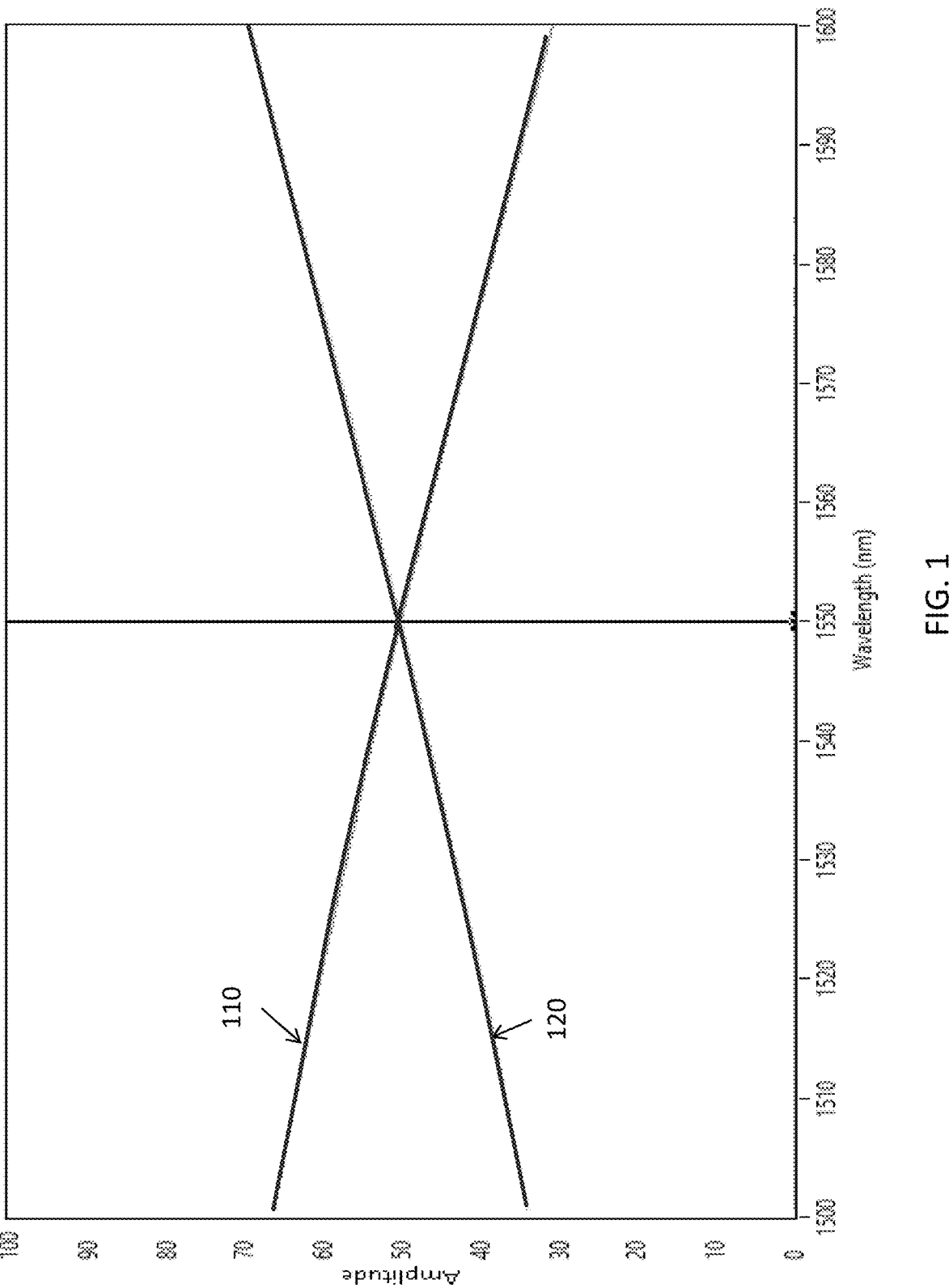
FIG. 1 shows the coupling ratio as a function of wavelength for a standard PM coupler.

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Typical PM fused couplers are made with two identical fibers. The generated optical coupling response is typically an X-shaped response as shown in FIG. 1 where the plot 110 is the signal port and the plot 120 is the tap port of the coupler. The coupling variation over the 100 nm bandwidth for each branch in this case is about 35%. Thus, typical couplers cannot provide stable coupling ratios over a wide wavelength range.

According to one embodiment of the present disclosure, an optical structure including two different PM fibers where respective lengths of the two fibers are fused together to create an optical coupler. Both PM fibers are single mode at the same wavelength. However, the two PM fibers are different in one or more selected structures, such as: spatial or geometrical arrangements, size and dimension, cross-sectional shape, composition and/or doping ratio of stress members, distance, mechanical stress, birefringence, propagation constants, PM types, etc. The difference in the selected one or more structure causes a frustrated coupling between the two fibers.

Figure 2:
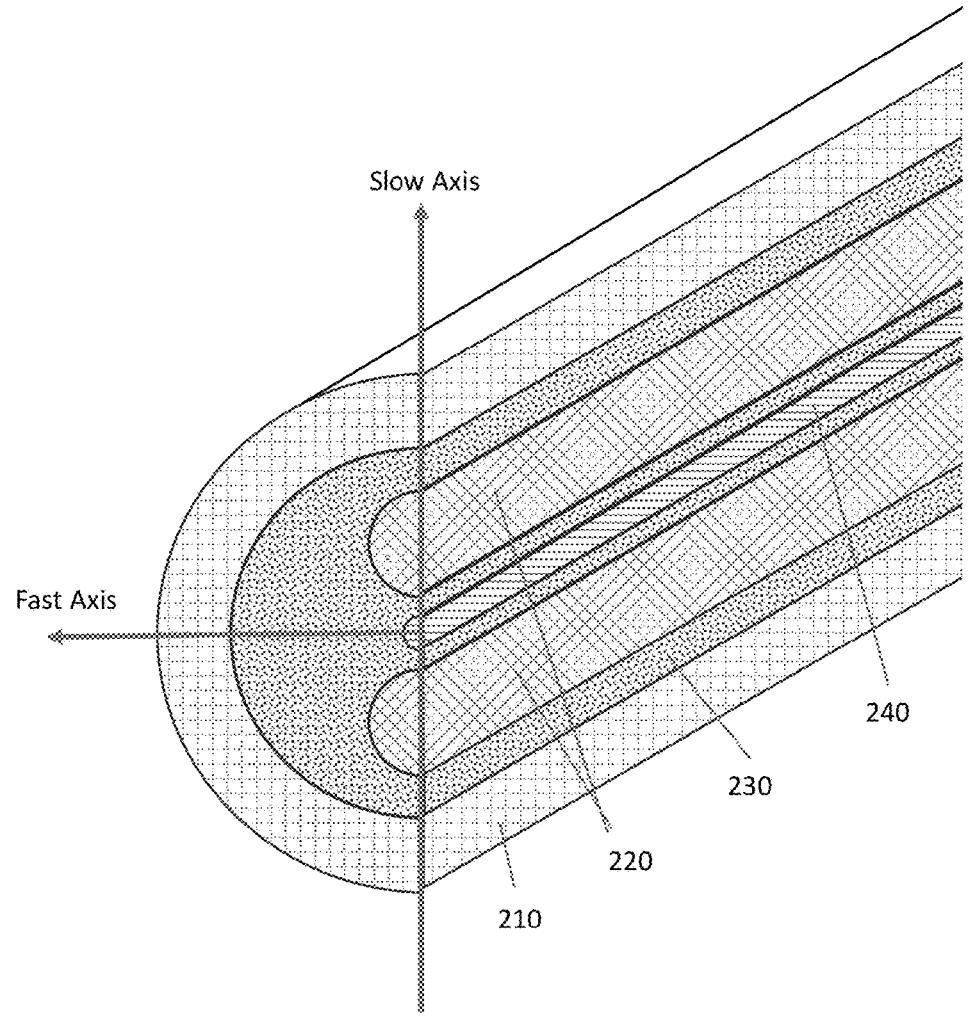
FIG. 2 shows the cross section structural view of a Panda fiber.

As an illustrative example, FIG. 2 shows a structural view of a Panda PM fiber. The Panda PM fiber includes a core 240 and two stress members 220 running along the length of the fiber, and they are aligned along the slow axis, and perpendicular to the fast axis. The core and stress members are embedded in a cladding material 230, and the fiber has an outside coating 210.

Figure 3:
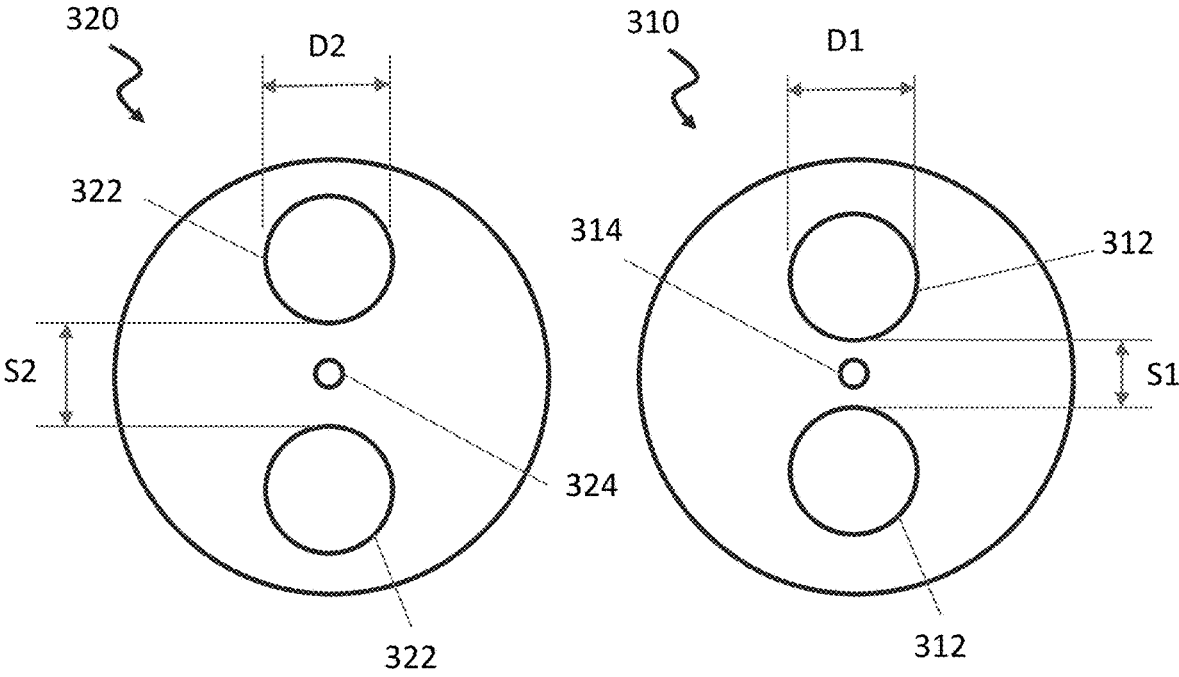
FIG. 3 shows the cross sections of two Panda fibers with different geometries.

In one example embodiment of the present disclosure, two panda PM fibers are selected based on the difference in the distance between the core of the fiber and the stress rods, as well as the difference in a dimension of these stress rods. FIG. 3 shows the two cross sections of two Panda fibers with different geometries. In FIG. 3, fiber 310 has a core 314 and a pair of stress members 312, and fiber 320 has a core 324 and a pair of stress members 322. The stress members 312 has a diameter of D1 and the stress members 312 are separated on opposite sides of the core 314 by a distance of S1. The stress members 322 has a diameter of D2 and the stress members 322 are separated on opposite sides of the core 324 by a distance of S2. In this example, the diameters D1, D2 and/or distances between stress rods S1, S2 (or distance between core and stress rod) are different between the two PM fibers. Note that other geometries are also contemplated for different types of PM fibers. For example, in the case of a bow tie type PM fiber, the geometries of interest may include the height, top base length, and bottom base length of the stress rod, distance from core to a base, etc. Furthermore, a difference in a material structure of the fiber components will result in different stress. In another embodiment, the composition and/or doping ratios of the stress members in the two PM fibers are different.

Figure 4:
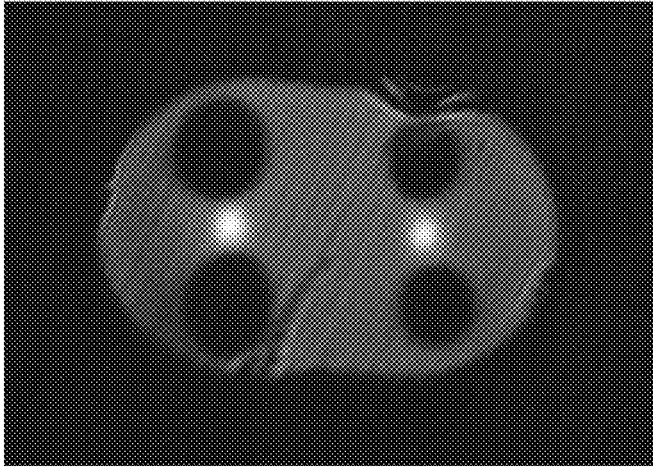
FIG. 4 shows two fused fibers in a single mode wideband PM fiber coupler according to one embodiment of the present disclosure.

By selecting two different PM fibers, an embodiment of the present disclosure provides an asymmetrical optical structure that generates frustrated coupling. FIG. 4 shows a photograph of the two fused fibers in a single mode wideband PM fiber coupler according to one embodiment of the present disclosure. In FIG. 4, the diameter of the stress members on the left side is larger than the diameter of the stress members on the right side, and the distance between the stress member on the left side is smaller than the distance between the stress member on the right side.

Figure 5:
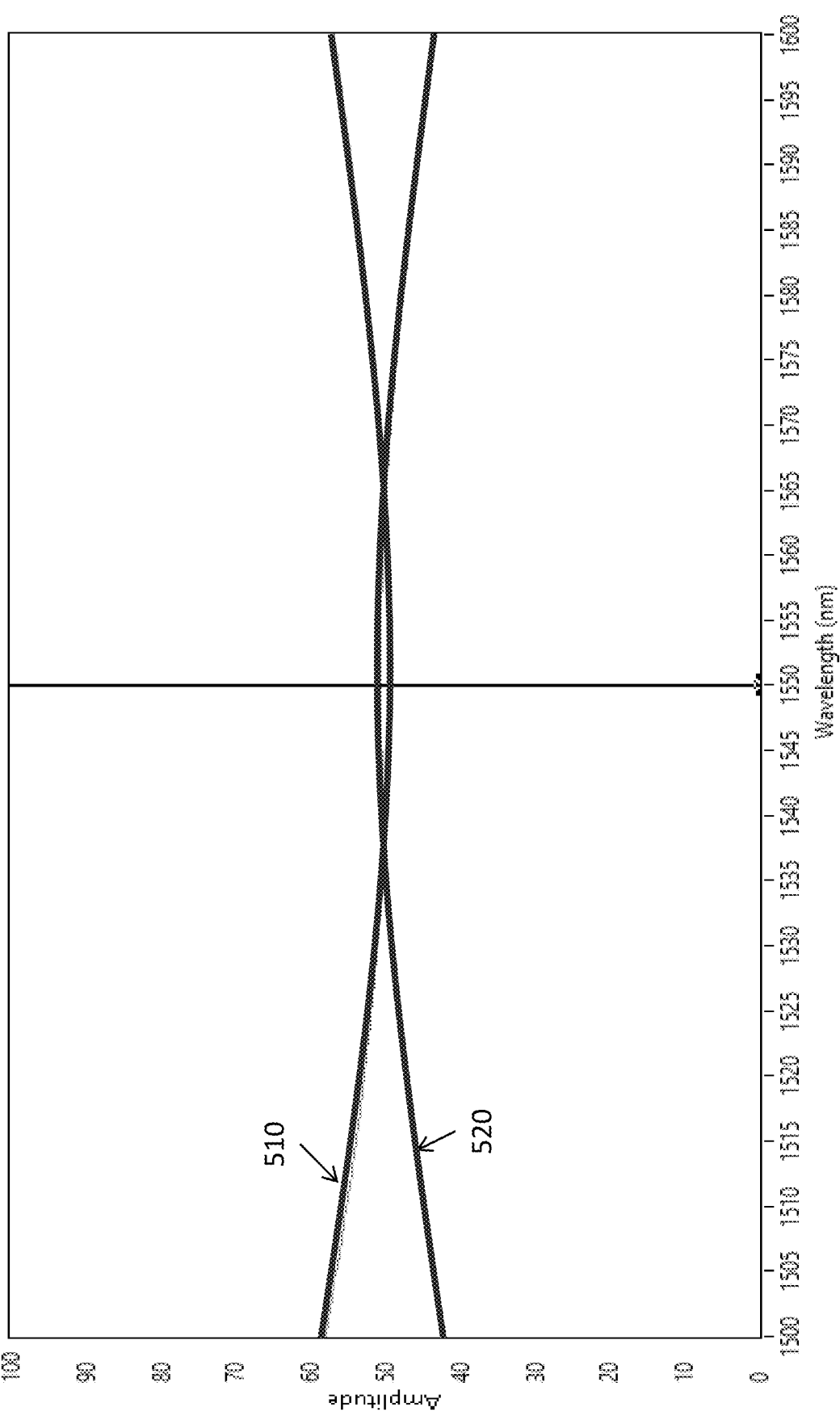
FIG. 5 shows the coupling ratio as a function of wavelength for a wideband PM coupler according to one embodiment of the present disclosure.

FIG. 5 shows the coupling ratio as a function of wavelength for a wideband PM coupler according to an embodiment of the present disclosure. In FIG. 5, the plot 510 is the signal port and the plot 520 is the tap port of the coupler. This new structure provides a much lower variation in the coupling ratio for each port of about 10% over the same 100 nm bandwidth.

Figure 6:
FIG. 6 shows an arrangement of a coupler having one input port and two output ports.

In another example, an arrangement as shown in FIG. 6 is used to compare a current PM fiber coupler against a PM fiber coupler according to an embodiment of the present disclosure. In the arrangement of FIG. 6, an input port (port 1) is split into a signal output port (port 2) and a tap output port (port 3) via a standard coupler in a first case, and a coupler according to an embodiment of the present disclosure in a second case.

Figure 7:
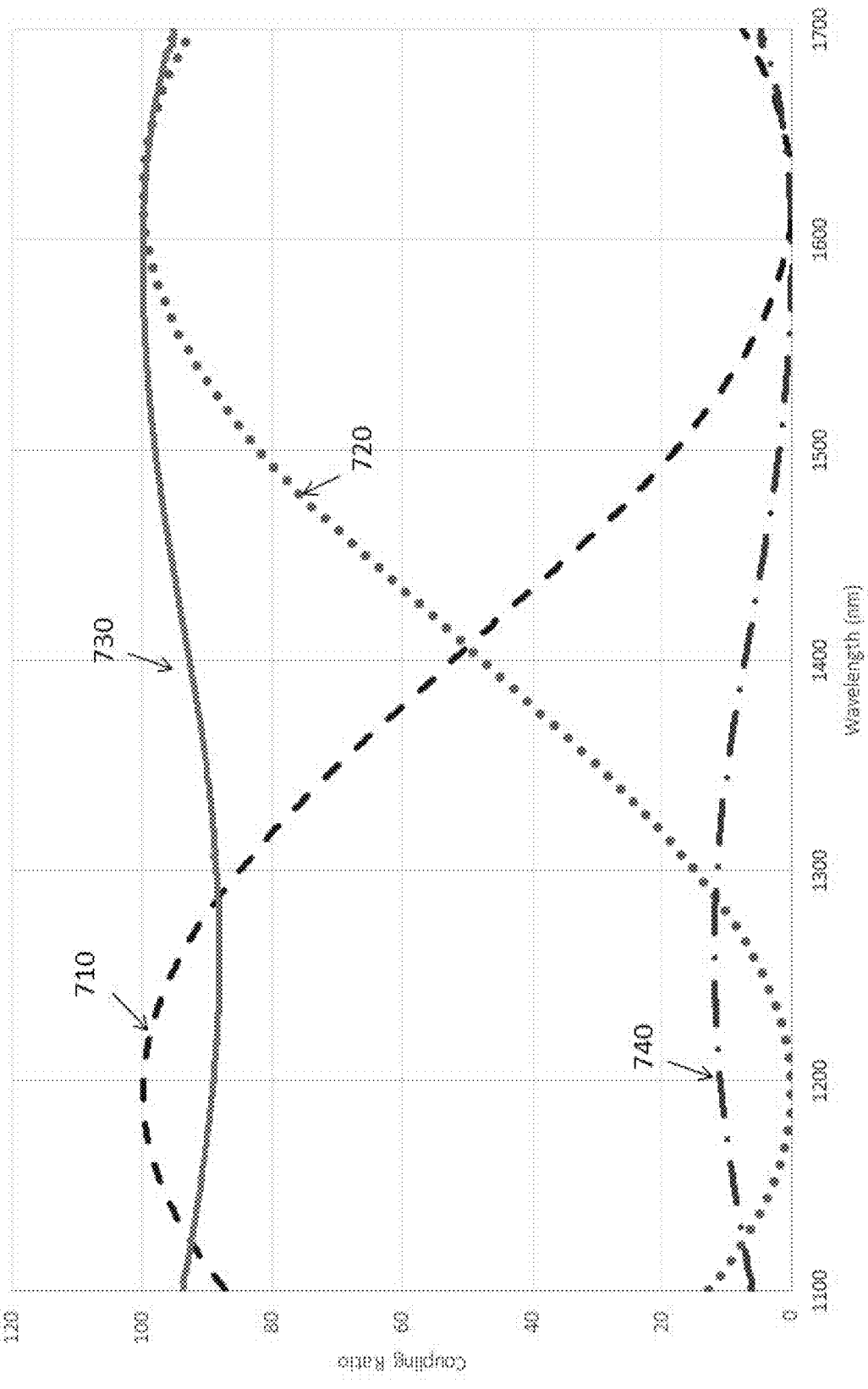
FIG. 7 shows the respective spectra of coupling response for symmetrical and asymmetrical fiber structures.

For a standard coupler in the first case, the fibers in the coupler are the same, and hence the coupling structure is symmetrical. In FIG. 7, the coupling ratio from port 1 to port 2 is shown as plot 710, and the coupling ratio from port 1 to port 3 is shown as plot 720. It is clear from the plots 710 and 720 that the coupling ratios of a standard coupler can vary widely from 0% to 100% over a wavelength range of about 400 nm. Thus, standard coupler would not be able to support applications that require coupling uniformity over a fairly large bandwidth.

For a coupler according to an embodiment of the present disclosure in the second case, the fibers have different structure, and hence the coupling is frustrated due to the asymmetry in the fiber structure. In FIG. 7, the coupling ratio from port 1 to port 2 is shown as plot 730, and the coupling ratio from port 1 to port 3 is shown as plot 740. It is clear from the plots 730 and 740 that the coupling ratios of a coupler according to an embodiment of the present disclosure only vary narrowly about 10% over a wavelength range of at least 600 nm. Therefore, a coupler according to an embodiment of the present disclosure is clearly superior over standard coupler in supporting applications that require coupling uniformity over a fairly large bandwidth.

Therefore, it is demonstrated that a polarization maintaining (PM) fiber optic coupler according to one embodiment of the present disclosure can achieve a greater coupling uniformity over a large optical bandwidth without adding any excess loss. This structure also maintains the linear slow axis injection polarization state.

Note that embodiments of the present disclosure are not limited to 1×2 or 2×2 PM couplers. It is contemplated that two or more PM fibers may be fused together to form a single mode wideband PM fiber coupler, wherein at least two PM fibers are different as discussed above in the previous embodiments.

While the present disclosure describes at some length and with some particularity with respect to the several described embodiments, it is not intended that it should be limited to any such particulars or embodiments or any particular embodiment, but it is to be construed so as to provide the broadest possible interpretation in view of the related art and, therefore, to effectively encompass various embodiments herein. Furthermore, the foregoing describes various embodiments foreseen by the inventor for which an enabling description was available, notwithstanding those modifications of the disclosure, not presently foreseen, may nonetheless represent equivalents thereto.

The invention claimed is:

1. A single mode wideband polarization maintaining (PM) fiber coupler, comprising:
   a first PM fiber having a first core and a pair of first stress members configured to provide a first mechanical stress to the first core; and
   a second PM fiber having a second core and a pair of second stress members configured to provide a second mechanical stress to the second core,
   wherein a length of the first PM fiber is fused with a corresponding length of the second PM fiber, and
   wherein a distance between the first core and the first stress members in the first PM fiber is different from a corresponding distance between the second core and the second stress members in the second PM fiber, and a difference between the distance in the first PM fiber and the corresponding distance in the second PM fiber causes a frustrated coupling between the first PM fiber and the second PM fiber.

2. The coupler of claim 1, wherein a dimension of the first stress member is different from a corresponding dimension of the second stress member.

3. The coupler of claim 1, wherein a cross-sectional shape of the first stress members is different from a cross-sectional shape of the second stress members.

4. The coupler of claim 1, wherein a composition and/or doping ratio of the first stress members is different from a composition of the second stress members.

5. The coupler of claim 1, wherein the first and second PM fibers are Panda type PM fibers.

6. The coupler of claim 1, further comprising one or more third PM fibers fused to the coupler, each third PM fiber having a third core and a pair of third stress members configured to provide a third mechanical stress to the third core.

7. A method of making a single mode wideband polarization maintaining (PM) fiber coupler, comprising:
   providing a first PM fiber having a first core and a pair of first stress members configured to provide a first mechanical stress to the first core;
   providing a second PM fiber having a second core and a pair of second stress members configured to provide a second mechanical stress to the second core; and
   fusing a length of the first PM fiber with a corresponding length of the second PM fiber,
   wherein the first and second PM fiber are selected such that a distance between the first core and the first stress members in the first PM fiber is different from a corresponding distance between the second core and the second stress members in the second PM fiber, and a difference between the distance in the first PM fiber and the corresponding distance in the second PM fiber causes a frustrated coupling between the first PM fiber and the second PM fiber.

8. The method of claim 7 further comprising selecting a dimension of the first stress member that is different from a corresponding dimension of the second stress member.

9. The method of claim 7, further comprising selecting a cross-sectional shape of the first stress members that is different from a cross-sectional shape of the second stress members.

10. The method of claim 7, further comprising selecting a composition and/or doping ratio of the first stress members that is different from a composition of the second stress members.

11. The method of claim 7, wherein the first and second PM fibers are Panda type PM fibers.

12. The method of claim 7, further comprising fusing one or more third PM fibers to the coupler, each third PM fiber having a third core and a pair of third stress members configured to provide a third mechanical stress to the third core.

* * * * *